United States Patent
Bellagamba et al.

(10) Patent No.: US 8,665,699 B2
(45) Date of Patent: Mar. 4, 2014

(54) LINK FAILURE DETECTION AND TRAFFIC REDIRECTION IN AN OPENFLOW NETWORK

(75) Inventors: Elisa Bellagamba, Stockholm (SE); James Kempf, Mountain View, CA (US); Pontus Skoldstrom, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 170 days.

(21) Appl. No.: 13/111,609

(22) Filed: May 19, 2011

(65) Prior Publication Data

US 2011/0286324 A1 Nov. 24, 2011

Related U.S. Application Data

(60) Provisional application No. 61/346,227, filed on May 19, 2010.

(51) Int. Cl.
*G01R 31/08* (2006.01)

(52) U.S. Cl.
USPC .......................................... 370/216; 370/242

(58) Field of Classification Search
None
See application file for complete search history.

(56) References Cited

U.S. PATENT DOCUMENTS

| | | | |
|---|---|---|---|
| 2005/0089050 A1* | 4/2005 | Cheriton ........................ | 370/397 |
| 2007/0207591 A1* | 9/2007 | Rahman et al. ................ | 438/439 |
| 2009/0138577 A1* | 5/2009 | Casado et al. ................. | 709/220 |

FOREIGN PATENT DOCUMENTS

EP 1912381 A1 4/2008

OTHER PUBLICATIONS

Bahadur et al. (LSP-Ping and BFD encapsulation over ACH—draft-ietf-mpls-tp-lsp-ping-bfd-procedures-00) IETF, Mar. 2010.*
Bocci et al. (MPLS Generic association channel—draft-ietf-mpls-tp-gach-gal-06) IETF, May 2009.*
Bahadur, N. et al. "LSP-Ping and BFD Encapsulation over ACH." IETF Network Working Group, Internet-Draft, Intended status: Standards Track, Mar. 23, 2010.
McKeown, N. et al. "OpenFlow: Enabling Innovation in Campus Networks." Available online at: http://www.openflow.org/documents/openflow-wp-latest.pdf. Mar. 14, 2008.
Zarifis, K. "[openflow-discuss] link failure detection." Email archive, Sep. 11, 2009.

* cited by examiner

*Primary Examiner* — Chirag Shah
*Assistant Examiner* — Rina Pancholi
(74) *Attorney, Agent, or Firm* — Coats & Bennett, P.L.L.C.

(57) ABSTRACT

Failure detection and traffic redirection are implemented in an OpenFlow switch. Link failure detection packets, such as Bidirectional Forwarding Detection (BFD) packets, are periodically sent out on links to peer OpenFlow switches, such as via the Multi-protocol Label Switching (MPLS) Transport Profile (MPLS-TP). Link failure detection packets are received from the peer OpenFlow switches on the links, and monitored. A link failure is detected if no incoming link failure detection packets are received on a link for a predetermined interval. In the event of a link failure, traffic is redirected from the failed link to a backup link by altering entries on a flow table of the OpenFlow switch.

22 Claims, 7 Drawing Sheets

LINK FAILURE DETECTION AND TRAFFIC REDIRECTION IN AN OPENFLOW NETWORK

The present application claims priority to U.S. Provisional Patent Application Ser. No. 61/346,227, filed May 19, 2010, titled, "Methods and Apparatus for Use in an Openflow Network," the disclosure of which is incorporated herein by reference in its entirety.

TECHNICAL FIELD

The present invention relates generally to OpenFlow data communication networks, and in particular to methods and apparatuses for implementing protection switching at an OpenFlow switch.

BACKGROUND

The OpenFlow Switching Protocol is defined by the OpenFlow Switch Consortium in the OpenFlow Switch Specification, and is intended as a way for researchers to run experimental protocols in their networks. FIG. 1 depicts a representation of an OpenFlow switch 10, which is based on an Ethernet switch, with an internal flow table 12 (also known as a forwarding table 12) that performs packet lookup and forwarding, and a secure channel 14 to an external controller 16. The controller 16 manages the OpenFlow switch 10 over the secure channel 12 using the OpenFlow protocol.

A flow table 12 contains a set of flow entries 18, one of which is depicted in FIG. 2. Each flow entry 18 comprises a set of flow rules 20 used to match against packets (i.e., header values that can be used to match against packet headers), a set of zero or more actions 22 to apply to matching packets, and activity counters 24. All packets processed by the OpenFlow switch 10 are compared against the flow table rules 20. If a matching entry 18 is found, any actions 22 for that entry 18 are performed on the packet (e.g., an action might be to forward a packet on a specified port). If no match is found, the packet is forwarded to the controller 16 over the secure channel 14. The controller 16 is responsible for determining how to handle packets that do not have valid flow entries 18, and manages the flow table 12 by adding and removing flow entries 18.

In the example depicted in FIG. 2, the flow entry rules 20 include fields from several layers of the protocol stack, such as the Ethernet MAC addresses, IP address, IP protocol, TCP/UDP port numbers as well as the incoming port number. Each entry must contain either a specific value, or a wildcard "ANY" entry, which matches any value. If the switch 10 supports subnet masks on the IP source and/or destination fields, these can more precisely specify matches.

Each flow entry 18 is also associated with zero or more actions 22 that dictate how the OpenFlow switch 10 handles packets that match the rules 20 of the flow entry 18. For example, these actions 22 can include dropping a packet, forwarding a packet on an outgoing port, forward the packet on the incoming port, forwarding a packet on all outgoing ports, forwarding the packer to the controller, and the like. If no actions 22 are present in a flow entry 18, then a packet matching that entry 18 is dropped. A switch 10 is not required to support all action types, as some actions 22 are required and others are optional. When connecting to the controller 16, a switch 10 indicates which of the optional actions 22 it supports.

The secure channel 14 is the interface that connects each OpenFlow switch 10 to a controller 16. Through this interface, the controller 16 configures and manages the switch 10, receives events from the switch 10, and sends packets out from the switch 10. All messages set over the secure channel 14 must be formatted according to the OpenFlow protocol defined in the OpenFlow Switch Specification. The OpenFlow protocol supports three message types: controller-to-switch messages, asynchronous messages, and symmetric messages, each of which has multiple sub-types.

Controller-to-switch messages are initiated by the controller 16 and used to directly manage or inspect the state of the switch 10. Controller-to-switch messages may or may not require a response from the switch 10. Controller-to-switch messages include Features messages, Configuration messages, Modify-State messages, Read-State messages, Send-Packet messages, and Barrier messages.

Features messages communicate supported features between the switch 10 and the controller 16. Upon Transport Layer Security (TLS) session establishment, the controller 16 sends a Features Request message to the switch 10. The switch 10 must reply with a Features Reply that species the capabilities supported by the switch 10.

Configuration messages configure the switch 10. The controller 16 sets and queries configuration parameters in the switch 10. The switch 10 only responds to a query from the controller 16.

Modify-State messages are sent by the controller 16 to manage state on the switches 10. Their primary purpose is to add/delete and modify flows in the flow tables 12 and to set switch port properties.

Read-State messages are used by the controller 16 to collect statistics from the switch's flow-tables 12, ports and the individual flow entries 18.

Send-Packet messages are used by the controller 16 to send packets out of a specified port on the switch 10.

Barrier request/reply messages are used by the controller 16 to ensure message dependencies have been met or to receive notifications for completed operations.

Asynchronous messages are initiated by the switch 10 and used to update the controller 16 of network events and changes to the switch 10 state. Switches 10 send asynchronous messages to the controller 16 to denote a packet arrival, switch 10 state change, or error. Asynchronous messages include Packet-in messages, Flow-Removed messages, Port-status messages, and Error messages.

A Packet-in message is sent from the switch 10 the controller 16 for every packet that does not have a matching flow entry 18 (or if a packet matches an entry 18 with a "send to controller" action 22). If the switch 10 has sufficient memory to buffer packets that are sent to the controller 16, the packet-in events contain some fraction of the packet header and a buffer ID to be used by the controller 16 when it is ready for the switch 10 to forward the packet. Switches 10 that do not support internal buffering (or have run out of internal buffering) must send the full packet to the controller 16 as part of the event.

Flow-Removed messages inform the controller 16 that the switch 18 has removed a flow entry 18 from the flow table 12. When a flow entry 18 is added to the switch 10 by a flow modify message, an idle timeout value indicates when the entry 18 should be removed due to a lack of activity. Additionally, a hard timeout value indicates when the entry 18 should be removed, regardless of activity. The flow modify message also specifies whether the switch 10 should send a flow removed message to the controller 16 when the flow expires. Flow modify messages which delete flows may also cause flow removed messages.

The switch 10 is expected to send Port-Status messages to the controller 16 as port configuration state changes. These events include change in port status (for example, if it was brought down directly by a user) or a change in port status.

Error messages are used by the switch 10 to notify the controller 16 of problems.

Symmetric messages are initiated by either the switch 10 or the controller 16 and are sent without solicitation. Symmetric messages include Hello messages, Echo messages, and Vendor messages.

Hello messages are exchanged between the switch 10 and controller 16 upon connection start-up.

Echo request/reply messages can be sent from either the switch 10 or the controller 16, and must return an echo reply. They can be used to indicate the latency, bandwidth, and/or liveness of a controller-switch connection.

Vendor messages provide a standard way for OpenFlow switches 10 to offer additional functionality within the Open Flow message space.

Protection switching is a general term referring to functionality for detecting a forwarding path/link failure in a transport network and automatically switching from the failed path/link to an operational link. Protection switching involves two mechanisms: a first mechanism for detecting that a failure has occurred in the packet forwarding path, and a second mechanism for redirecting traffic affected by the error onto a working forwarding path.

The error detection mechanism typically involves transmitting error-detection packets between network elements, either over a single link or over a multi-hop path. If the receiving node fails to receive a certain number of consecutive error-detection packets, then the forwarding between the network elements is considered broken. The error detection time resolution, i.e., how fast an error is detected, depends on the frequency of error-detection packet transmission and the number of packets that failed to be forwarded. The transmission frequency is typically an order of magnitude higher than the desired detection time, in order to provide a margin wherein a few packets may be lost without the failure detection mechanism triggering a false positive. So, for example, if the desired error detection time is 1 second, the transmission frequency may be 10 Hz.

The traffic redirection mechanism is triggered by the error detection mechanism upon forwarding failure and is responsible for quickly redirecting the traffic affected by the failure onto a working path. This may involve calculating a new path, or switching to a preconfigured path. Typically, in high-performance transport networks, the requirement is a maximum 50 milliseconds for detecting a failure and switching to a working path.

Within the current OpenFlow Switch specification, both of the mechanisms required to perform protection switching (i.e., failure detection and traffic redirection) must be implemented in the controller 16. Using the Send-Packet and Packet-In functions defined in the OpenFlow protocol, the controller 16 can instruct a switch 10 to transmit a packet on a particular forwarding path, and can receive a packet from a switch 10. If a failure is detected, the controller 16 can then update the flow table entries 18 to perform the traffic redirection. However, this solution has three major disadvantages.

First, there is a high latency in the protection switching, since information from the switch 10 must reach the controller 16 over the secure channel 14. The traffic redirection latency, i.e., the time between failure detection and actual traffic redirection, is high and variable (jitter) since the controller 16 must perform the reconfiguration of the forwarding path using the secure channel 14.

Second, the existing solution places a high load on the controller 16, since it has to transmit and receive the failure detection packets, which must be transmitted at a relatively high frequency for an acceptable failure detection time. Also, the load on the controller increases roughly linearly with each monitored path, which makes the solution difficult to scale.

Third, there is a high risk of false positives in the error detection. Since the controller 16 is transmitting and receiving the failure detection packets using the secure channel 14, not only is the path between two switches 10 monitored (which is the intention) but also the secure channel 14 itself. The secure channel 14 may be transported over an arbitrary number of hops, so it its very likely that the failure detection mechanism would trigger on changes in the secure channel 14 forwarding, thus falsely triggering traffic redirection.

SUMMARY

According to embodiments of the present invention described and claimed herein, failure detection and traffic redirection are implemented in an OpenFlow switch. Link failure detection packets, such as Bidirectional Forwarding Detection (BFD) packets, are periodically sent out on links to peer OpenFlow switches. Link failure detection packets are received from the peer OpenFlow switches on the links, and monitored. A link failure is detected if no incoming link failure detection packets are received on a link for a predetermined interval. In the event of a link failure, traffic is redirected from the failed link to a backup link.

One embodiment relates to an apparatus configured to operate as an OpenFlow switch. The apparatus includes a transmitter operative to periodically send outgoing link failure detection packets on one or more links, wherein each link is used to carry traffic to a peer OpenFlow switch. The apparatus also includes a receiver operative to receive incoming link failure detection packets, from each peer OpenFlow switch, over the one or more links. The apparatus further includes a link failure detection unit operative to monitor the reception of incoming link failure detection packets. The link failure detection unit is further operative to determine that a link has failed if incoming link failure detection packets have not been received on that link for a predetermined interval. The apparatus additionally includes a link failover unit operative to redirect traffic intended for a failed link to a backup link in response to a determination of a link failure.

Another embodiment relates to a method of operating an OpenFlow switch. Outgoing link failure detection packets are periodically sent on one or more links, each link being used to carry traffic to a peer OpenFlow switch. Incoming link failure detection packets are received, from each peer OpenFlow switch, over the one or more links. The reception of incoming link failure detection packets is monitored. A determination that a particular link has failed is made if incoming link failure detection packets have not been received on that link for a predetermined interval. Traffic intended for the failed link is then redirected to a backup link.

Yet another embodiment relates to a nontransient machine-readable medium. The nontransient machine-readable medium includes one or more computer programs operative to cause a computing apparatus, which is operatively connected to a communication network, to operate as an OpenFlow switch. The computer programs are operative to cause a computing apparatus to perform the steps of periodically sending outgoing link failure detection packets on one or more links, each link being used to carry traffic to a peer OpenFlow switch; receiving incoming link failure detection packets, from each peer OpenFlow switch, over the one or more links; monitoring the reception of incoming link failure detection packets; determining that a particular link has failed if incoming link failure detection packets have not been received on that link for a predetermined interval; and redirecting traffic intended for the failed link to a backup link.

Still another embodiment relates to a computer system operatively connected to a communication network and configured to operate as an OpenFlow switch. The computer system includes a transmitter operative to periodically send outgoing link failure detection packets on one or more links connected to the communication network, each link being used to carry traffic to a peer OpenFlow switch. The computer system also includes a receiver operative to receive incoming link failure detection packets over the one or more links from each peer OpenFlow switch. The computer system further includes a processor operative to monitor the reception of incoming link failure detection packets, and further operative to determine that a link has failed if incoming link failure detection packets have not been received on the link for a predetermined interval, and still further operative to redirect traffic intended for a failed link to a backup link.

DETAILED DESCRIPTION

Figure 1:
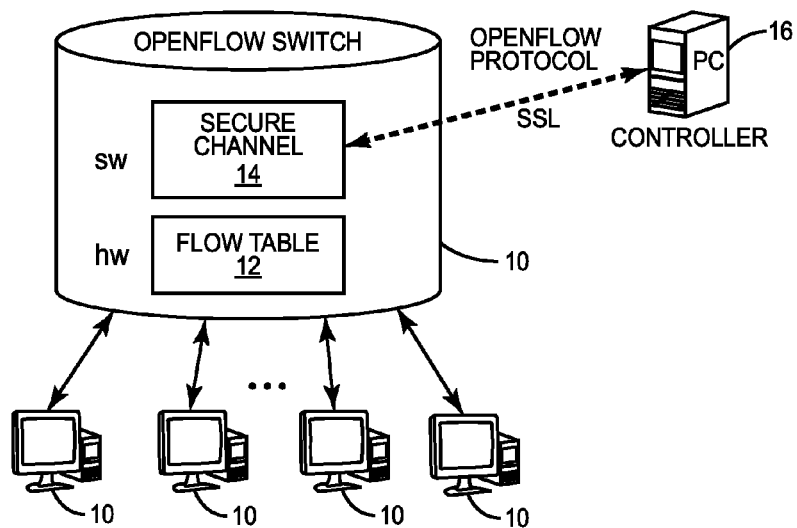
FIG. 1 is a functional schematic diagram of an OpenFlow switch and its controller, according to the prior art.
Figure 2:
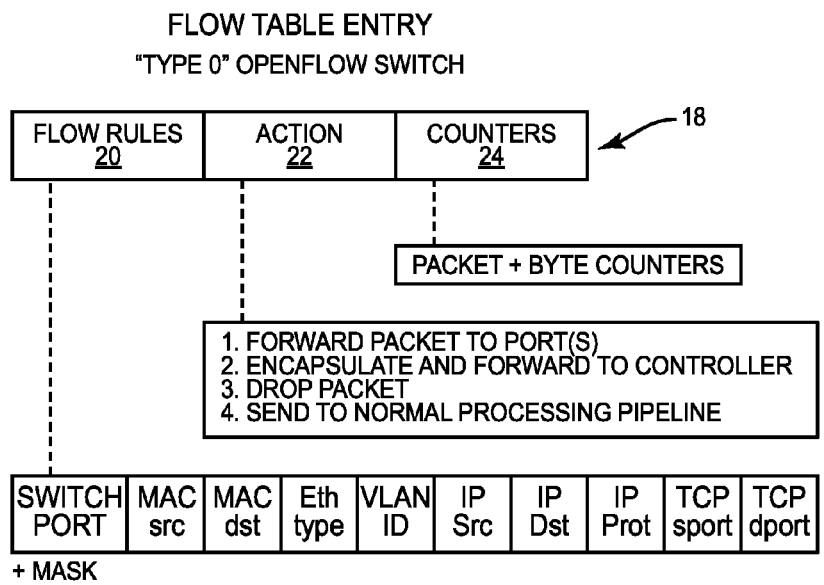
FIG. 2 is a functional block diagram of an OpenFlow switch flow table entry, according to the prior art.

Embodiments of the present invention perform failure detection and traffic redirection at an OpenFlow switch 10 in order to implement protection switching. The OpenFlow Switch specification does not provide any mechanism for performing either failure detection or traffic redirection at the switch 10. In particular, OpenFlow lacks the mechanisms to perform the required packet processing. In the current Open-Flow specification, there is support for a very small set of processing actions, such as replacing an IP address or VLAN identifier. However, most of the supported processing involves modifying a packet's existing header fields. Therefore, in order to achieve this protection switching, it is proposed here to extend the concept of virtual/logical ports in order to generate outgoing Bidirectional Forwarding Detection (BFD) traffic, and to terminate incoming BFD traffic A virtual or logical port is a software emulation of a port that normally would be present in hardware. In the context of OpenFlow switches 10, a virtual port is an "action block" that may be configured to perform a packet processing action. For example, a virtual port may be used to push an MPLS label onto an incoming packet (in OpenFlow 1.1, MPLS is built into the OpenFlow protocol). In order to process an incoming packet, the packet is forwarded to a configured virtual port as if the virtual port was a physical port. When the virtual port has processed the packet it can then be forwarded to the actual physical port.

Bidirectional Forwarding Detection (BFD) is a simple "hello" protocol defined in IETF Internet Draft draft-ietf-bfd-base-11. In BFD, a pair of systems transmit BFD packets periodically over each path between the two systems and, if one of the systems stops receiving BFD packets for long enough, some component in that particular bidirectional path to the other system is assumed to have failed. A path is only declared to be operational when two-way communication has been established between the systems, although this does not preclude the use of unidirectional links to support bidirectional paths (co-routed or bidirectional or associated bidirectional).

BFD operates on top of any data protocol (network layer, link layer, tunnels, etc.) being forwarded between two systems, and is always run in a unicast, point-to-point mode. The BFD packets are carried as the payload of whatever encapsulating protocol is appropriate for the medium and network.

BFD can provide failure detection on any kind of path between systems, including direct physical links, virtual circuits, tunnels, MPLS LSPs, multi-hop routed paths, and unidirectional links (so long as there is some return path, of course.) Multiple BFD sessions can be established between the same pair of systems when multiple paths between them are present in at least one direction, even if a lesser number of paths are available in the other direction (multiple parallel unidirectional links or MPLS LSPs, for example).

In order to implement BFD for an OpenFlow switch 10, embodiments of the present invention make use of the Multiprotocol Label Switching (MPLS) Transport Profile (MPLS-TP) in order to enable both IP and non-IP traffic to carry the BFD data.

MPLS is data-carrying mechanism defined in IETF RFC 3031. In an MPLS network, data packets are assigned labels. Packet-forwarding decisions are then made solely on the contents of the label, without the need to examine the packet itself. This enables the creation of end-to-end circuits across any type of transport medium, using any protocol. The primary benefit is to eliminate dependence on a particular Data Link Layer technology, such as ATM, frame relay, SONET, or Ethernet, and eliminate the need for multiple Layer 2 networks to satisfy different types of traffic. MPLS works by prefixing packets with an MPLS header, containing one or more labels organized as a last-in, first-out (LIFO) stack. This is called a label stack. These MPLS-labeled packets are switched after a label lookup or label switch instead of a lookup using an IP header.

A Label Switched Path (LSP) is a path through an MPLS network, set up based on criteria in a forwarding equivalence class (FEC). The path begins at a Label Edge Router (LER), which makes a decision on which label to prefix or "push" on to a packet based on the appropriate FEC of the packet. The LER then forwards the packet along to the next router in the path, which forwards the packet to the next router based on the contents of the label. The last router in the path removes or "pops" the label from the packet and forwards the packet based on the header of its next layer, for example IPv4. Due to the forwarding of packets through an LSP being opaque to higher network layers, an LSP is also sometimes referred to as an MPLS tunnel. The router which first prefixes the MPLS header to a packet is called an ingress router. The last router in an LSP, which pops the label from the packet, is called an egress router. The routers in between, which need only swap labels, are called transit routers or Label Switching Routers (LSR). LSPs are unidirectional as they enable a packet to be label switched through the MPLS network from one endpoint to another. Since bidirectional communication is typically desired, an LSP in the other direction can be set-up to compensate provide this.

In some applications, the packet presented to an LER may already have a label, such that the new LER pushes a second label onto the packet. When a labeled packet is received by an LSR, the topmost label is examined. Based on the contents of the label a swap, push (impose) or pop (dispose) operation can be performed on the packet's label stack. Routers can have pre-defined lookup tables that tell them which kind of operation should be performed, based on the topmost label of the incoming packet, so that they can process the packet very quickly.

In a swap operation, the label is swapped with a new label, and the packet is forwarded along the path associated with the new label. In a push operation, a new label is pushed on top of the existing label, effectively "encapsulating" the packet in another layer of MPLS. This allows hierarchical routing of MPLS packets. Notably, this is used by MPLS Virtual Private Networks (VPN). In a pop operation, the label is removed from the packet, which may reveal an inner label below. This process is called "decapsulation." If the popped label was the last on the label stack, the packet "leaves" the MPLS tunnel. This is usually done by the egress LER.

During these operations, the contents of the packet below the MPLS Label stack are not examined. Indeed, transit routers typically need only examine the topmost label on the stack. The forwarding of the packet is done based on the contents of the labels, which allows "protocol-independent packet forwarding" that does not need to look at a protocol-dependent routing table, and avoids the expensive IP longest prefix match at each hop.

MPLS-TP is a set of MPLS protocols for connection-oriented, packet transport networking that are being defined by the IETF (see, for example, IETF RFC 5654). MPLS-TP is a simplified version of MPLS for transport networks with some of the MPLS functions turned off, and extended where necessary with Operations, Administration and Maintenance (OAM) tools that are widely applied in existing transport network technologies such as SONET/SDH or OTN.

Two important components of the OAM mechanisms of MPLS-TP are the Generic Associated Channel (G-ACh) and the G-ACh Label (GAL), as defined in IETF RFC 5586. The G-ACh is a generalization of the Associated Channel (ACh) mechanism defined by IETF RFC 4385, and is a container, or channel, that runs on the LSP and carries OAM signaling. The OAM signaling is achieved by the GAL and subsequent associated OAM message embedded within the Associated Channel Header (ACH) within the payload. The GAL (a reserved MPLS label with value 13) is a label-based exception mechanism that serves to identify to an LSR (or LER) that a packet it receives on an LSP contains an ACH followed by a non-service payload.

Figure 3:
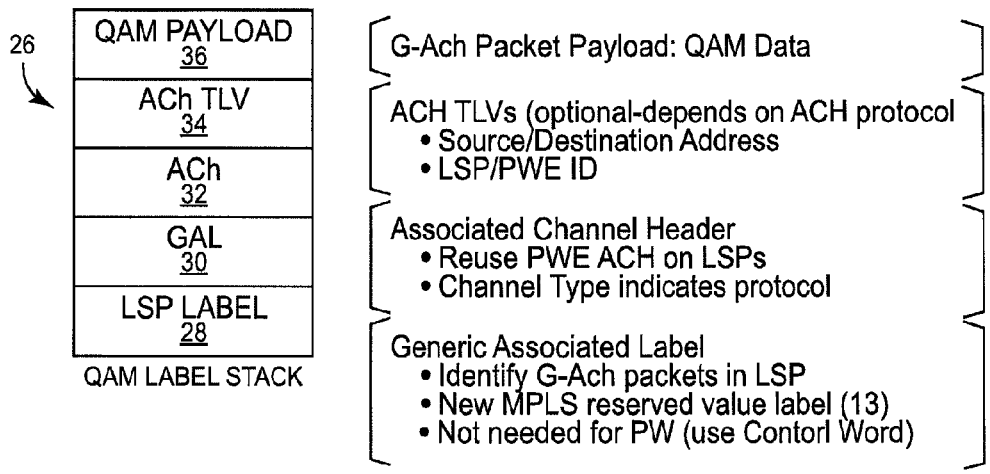
FIG. 3 is a functional block diagram of an OpenFlow switch flow table entry, according to one embodiment of the present invention.

FIG. 3 depicts the format of a G-ACh packet 26. The packet 26 includes an LSP label 28, a GAL 30, the ACH 32, an ACH Type-Length-Value (TLV) Header and one or more ACH TLVs 34, and the G-ACh packet payload 36. The LSP label 28 is an MPLS label used to route the packet over the LSP. The GAL 30 is an MPLS label used to enable an LER to identify that a packet contains an ACH followed by a non-service payload. The ACH 32 identifies that the packet is used for OAM functions. The ACH TLV layer 34 is optional, and provides additional context information to the G-ACh packet. For example, one use of the ACH TLVs might be to identify the source and/or intended destination of the associated channel message. Finally, the G-Ach packet payload 36 carries the OAM data.

MPLS-TP OAM operates in the context of Maintenance Entities (MEs) that are a relationship between any two points of a transport path to which maintenance and monitoring operations apply. The collection of one or more MEs that belongs to the same transport path, and that are maintained and monitored as a group, are known as a maintenance entity group (MEG), and the two points that define a maintenance entity are called Maintenance Entity Group (MEG) End Points (MEPs). In between these two points zero or more intermediate points, called Maintenance Entity Group Intermediate Points (MIPs), can exist and can be shared by more than one ME in a MEG.

Figure 4A:
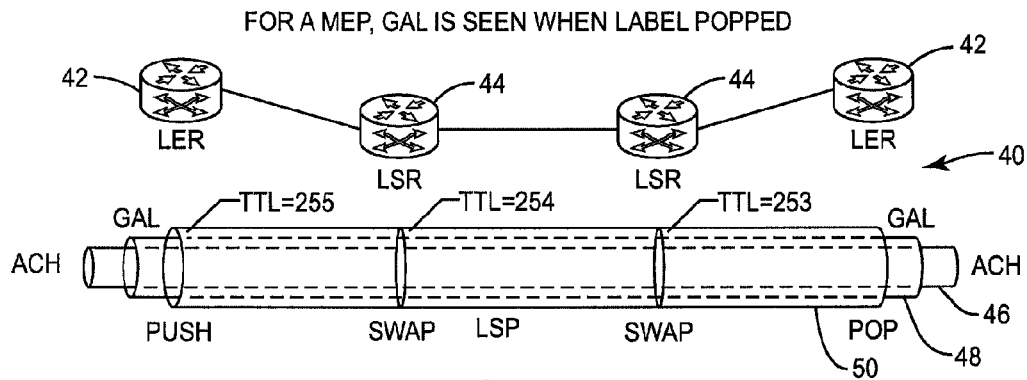
FIGS. 4A and 4B are network diagrams depicting an Associated Channel in LSP tunnels according to one embodiment of the present invention.
Figure 4B:
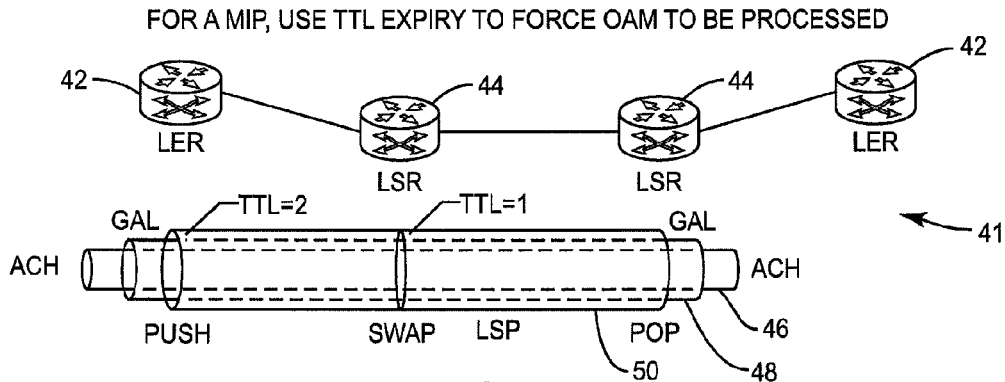

FIG. 4A depicts an OAM embodiment 40 in which an Associated Channel 46 is transported inside an LSP or MPLS tunnel 50. In this embodiment 40, the MEP is the LER 42 terminating the end-to-end OAM functionality, and an MIP is one of the LSRs 44 traversed by the end-to-end OAM functionality. The GAL 48 is exposed at the MEP (i.e., LER 42) when the outer label is popped. FIG. 4B depicts a similar OAM embodiment 40, in which the GAL 48 is exposed at an MIP (i.e., LSR 44) by the appropriate setting of the TTL fields in the outer label.

Figure 5:
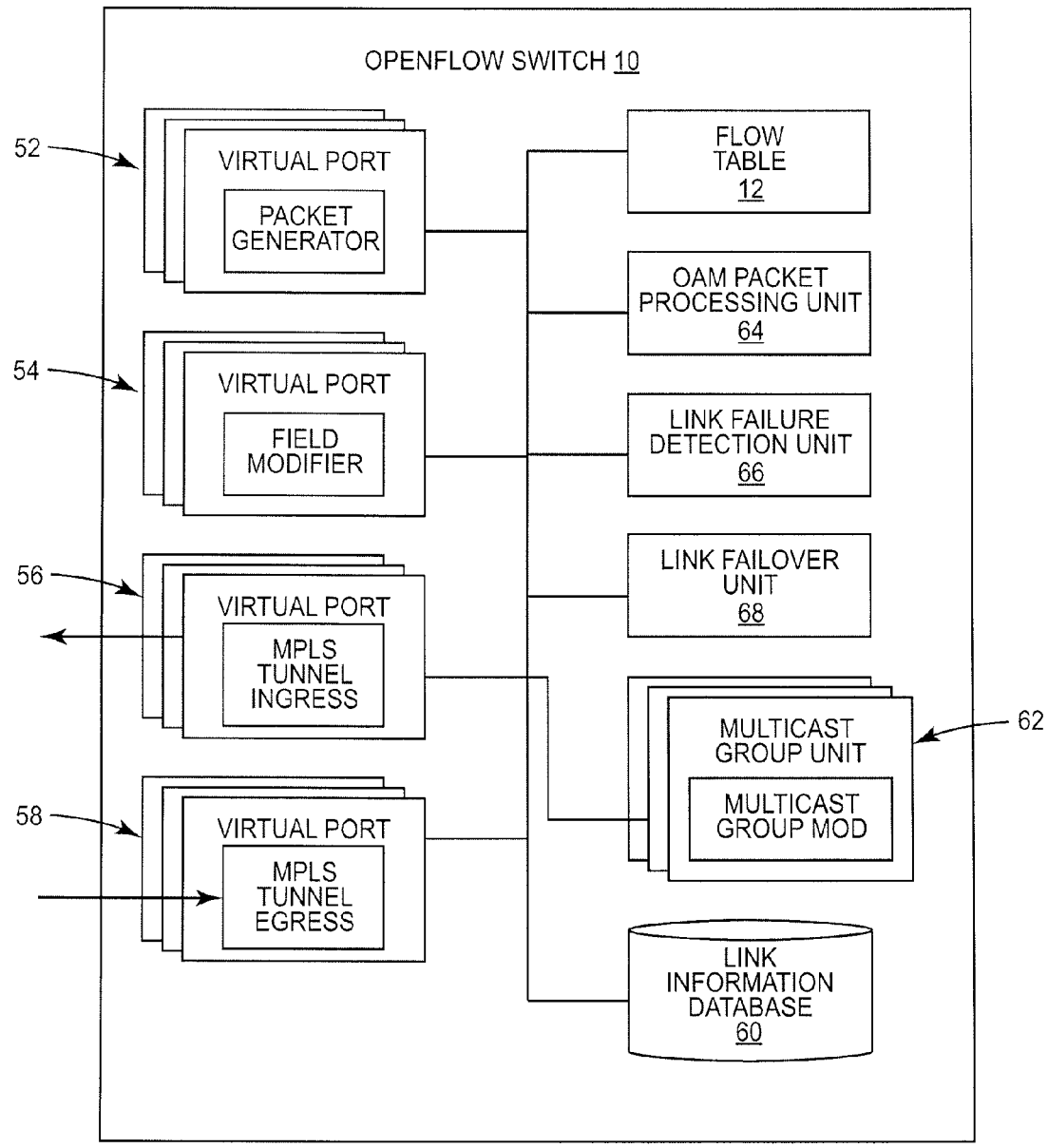
FIG. 5 is a functional block diagram of an OpenFlow switch according to one embodiment of the present invention.

FIG. 5 depicts a functional block diagram of an OpenFlow switch 10 according to one embodiment of the present invention. The OpenFlow switch 10 comprises a set of virtual ports 52, 54, 56, 58, a flow table 12 and a link information database 60. The OpenFlow switch 10 also comprises a plurality of multicast group units 62, an OAM packet processing unit 64, a link failure detection unit 66, and a failover unit 68. A first subset of the virtual ports 52 are each configured to provide a packet generator function. A second subset of the virtual ports 54 are each configured to provide a field modifier function. A third subset of the virtual ports 56 are each configured to provide ingress into an MPLS Tunnel/LSP. A fourth subset of the virtual ports 58 are each configured to provide egress out of an MPLS Tunnel/LSP.

Each multicast group unit 62 provides a "Multicast Group Mod" function. In Open Flow, a group is used to implement multipath load balancing, multicast, and broadcast forwarding. A group is defined as a collection of logical ports and a set of weights indicating how traffic should be distributed over each of the ports. The group itself is also assigned a logical port, and a Flow Mod is used to insert a flow matching rule 20 and a corresponding action 22 into the flow table 12 of an OpenFlow switch 10. The action 22 requires that any packets matching the rule 20 are forwarded to the group logical port. For packets that are forwarded to the group logical port, the group duplicates the packets and distributes them over the set of logical ports in the group according to the weights. Two types of group are supported: multipath and multicast. Multicast groups are restricted so as to not forward out of the incoming port. In order to install a group entry, an OpenFlow controller 16 issues a Group Mod command.

Figure 6:
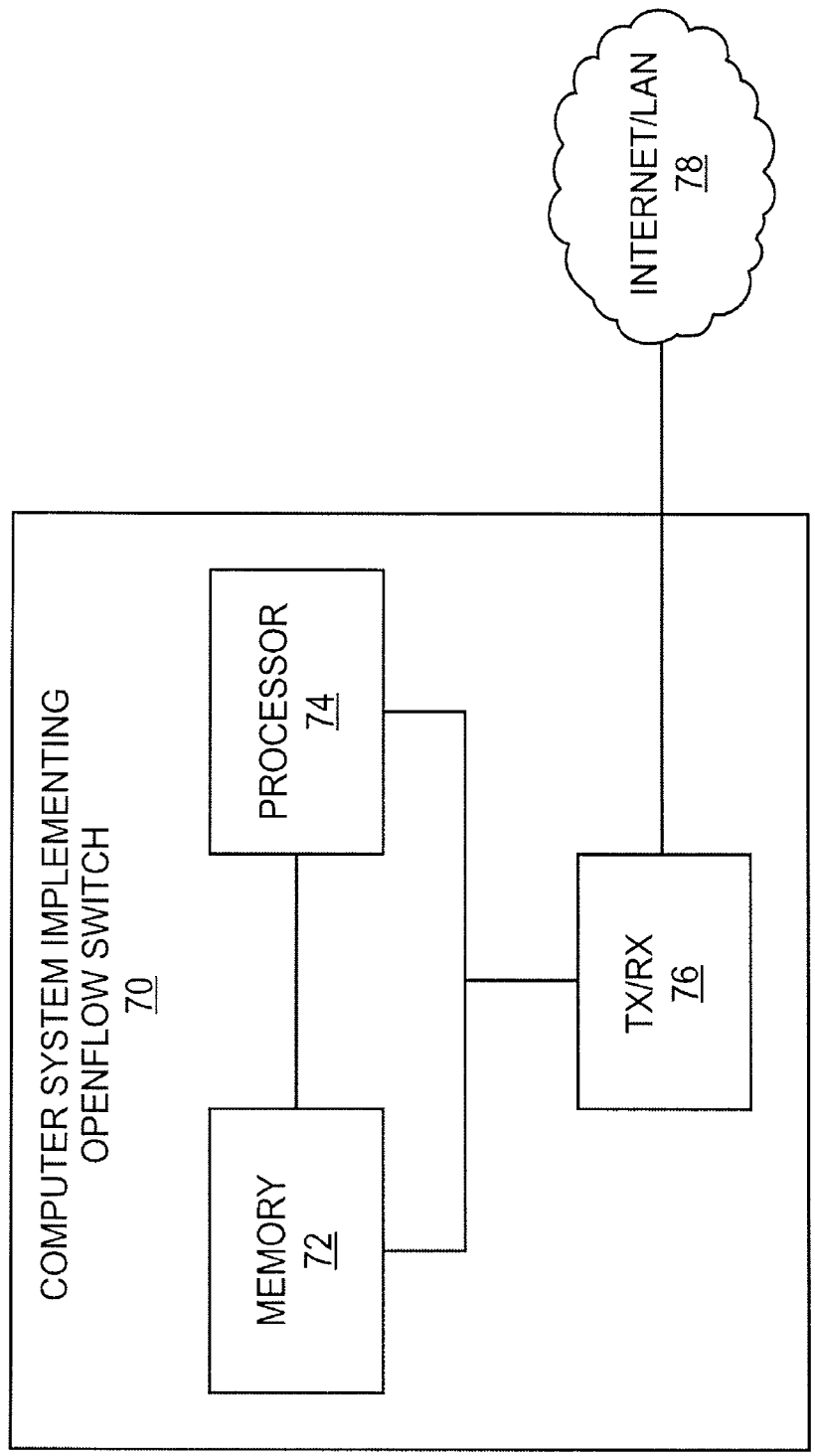
FIG. 6 is a functional block diagram of a computer system implementing an OpenFlow switch according to one embodiment of the present invention.

The OpenFlow switch 10 of FIG. 5 can be implemented as a combination of computer hardware and appropriate software. FIG. 6 depicts a functional block diagram of a computer system 70 implementing an OpenFlow switch 10 according to one embodiment of the present invention. The computer system 70 comprises a memory 72, a processor 74, and a transceiver 76.

The memory 72 stores the various programs that are executed by the processor 74, and also provides a storage unit for any required data such as that in the flow table 12 and the link information database 60. The memory 72 may comprise any nontransient machine-readable media known in the art or that may be developed, including but not limited to magnetic media (e.g., floppy disc, hard disc drive, etc.), optical media (e.g., CD-ROM, DVD-ROM, etc.), solid state media (e.g., SRAM, DRAM, DDRAM, ROM, PROM, EPROM, Flash memory, etc.), or the like. The program files stored in the memory 72, and executed by the processor 74, include, e.g., the virtual ports 52, 54, 56, 58 and their associated functions, the flow table 12, the multicast group units 62, the OAM packet processing unit 64, the link failure detection unit 66, and the failover unit 68.

The processor 74 may comprise any sequential state machine operative to execute machine instructions stored as machine-readable computer programs in the memory 72, such as one or more hardware-implemented state machines (e.g., in discrete logic, FPGA, ASIC, etc.); programmable logic together with appropriate firmware; one or more stored-program, general-purpose processors, such as a microprocessor or Digital Signal Processor (DSP), together with appropriate software; or any combination of the above.

The transceiver 76 is used to communicate with other OpenFlow switches 10 over a communications network 78 such as the Internet or a LAN. The transceiver 76 may conform to one or more communication protocols known in the art or that may be developed, such as Ethernet, TCP/IP, SONET, ATM, IEEE 802.xx, CDMA, WCDMA, GSM, LTE, WiMax, or the like. The transceiver implements transmitter and receiver functionality appropriate to the physical communication network 78 links. The transmitter and receiver functions may share circuit components and/or software, or alternatively may be implemented separately.

Figure 7:
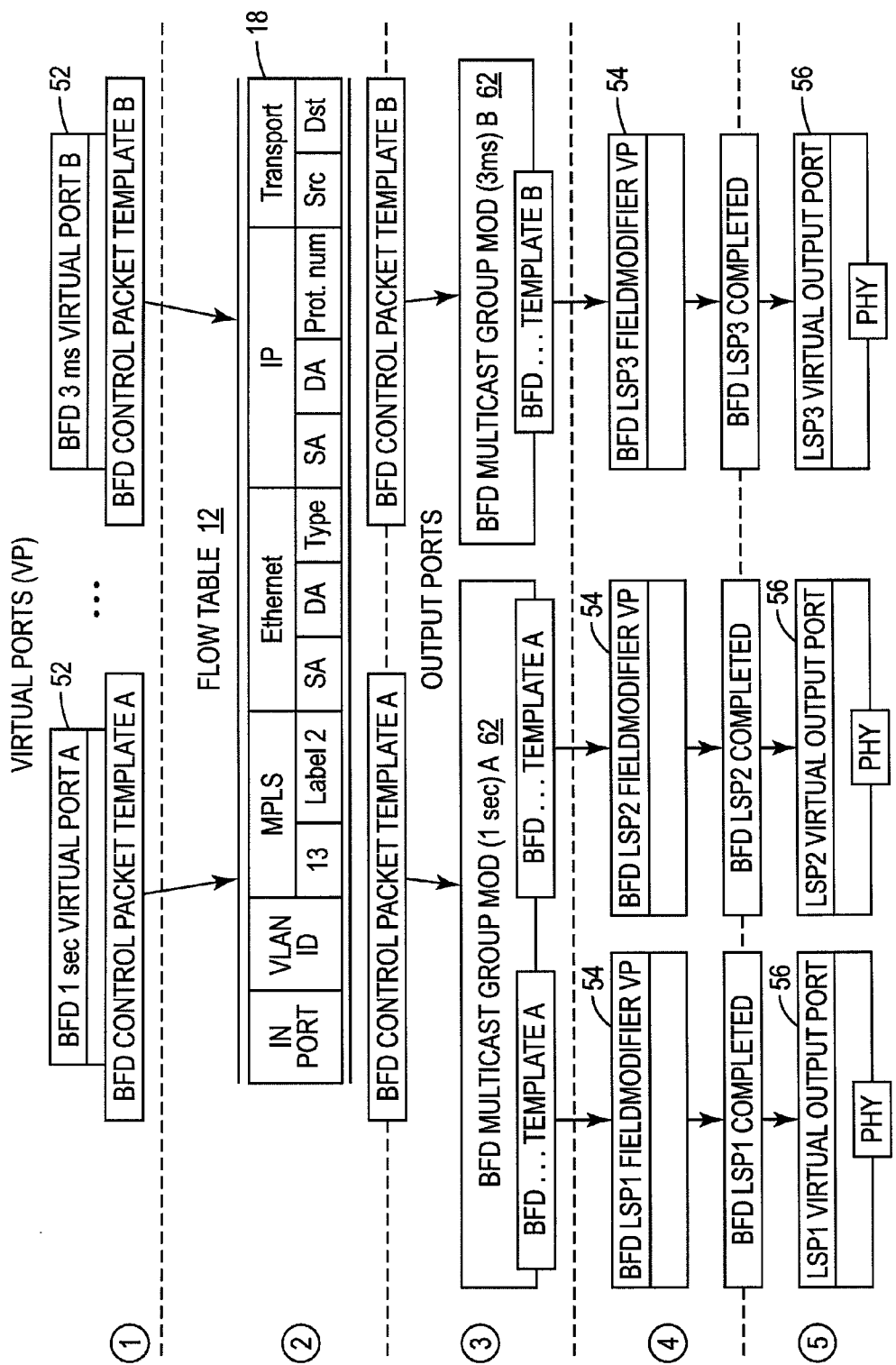
FIG. 7 is a packet template flow diagram depicting the generation and sending of packets on a control channel by an OpenFlow switch according to one embodiment of the present invention.

FIG. 7 depicts a diagram illustrating the process of an OpenFlow switch 10 generating and sending BFD packets on an MPLS G-Ach control channel. The steps discussed below correspond to the numbered sections of FIG. 7.

In step 1, the packet generator 52 generates BFD packet templates with a pre-configured interval. For example, as illustrated, "BFD packet generator A" provided by "virtual port A" generates "BFD packet template A" every second, whereas "BFD packet generator B" of "virtual port B" generates "BFD packet template B" every 3 milliseconds. The BFD packet template does not yet contain any information related to a particular BFD session. However, the packet generator 52 may fill in the timing fields of the BFD packet (i.e., Desired Min TX Interval, Required Min RX Interval, etc.), the necessary ACH TLVs, and the GAL MPLS label. The source port field (i.e. "In Port") of the BFD packet template is set to the virtual port number of the packet generator 52 (i.e., the port number of virtual port A or virtual port B).

In step 2, the newly-generated BFD packet template is sent to the flow table 12 for matching. The flow table 12 is configured with a flow matching rule 20 that matches the incoming BFD packet template. The action 22 defined for that rule 20 requires that the matching packets be forwarded to a multicast group unit 62 that is configured to handle packets with the same generation interval as the BFD packet generator 52 that generated the packet. For example, "BFD packet template A" is forwarded to the multicast group unit 62 implementing "BFD Multicast Group Mod A," and which has been configured to handle BFD packets generated every second. In contrast, "BFD packet template B" is forwarded to the multicast group unit 62 implementing "BFD Multicast Group Mod B," and which has been configure to handle BFD packets generated every 3 milliseconds. In other words, packets generated by BFD packet generators 52 with different intervals will be forwarded to different BFD Multicast Group Mods 62.

In step 3, when a multicast group unit 62 receives a BFD packet template, it will replicate the packet template, generating a packet for each LSP of the multicast group. The multicast group unit 62 then forwards each generated packet to a different virtual port 54, each of which provides a field modifier function for an LSP of the multicast group.

In step 4, each of the field modifier virtual ports 54 fills in those fields of the packet that are currently empty. For example, the field modifier virtual ports 54 complete the "My Discriminator" and "Your Discriminator" values that identify the BFD session on the link, and G-ACh TLV fields associated with a particular BFD session. The field modifier virtual ports 54 are each configured with the MEP ID and the number of the virtual port 56 that provide ingress into the associated LSP/MPLS tunnel. The MEP-ID is used to do a lookup in the link information database 60, which provides an associative data structure containing all the BFD session information for each link (e.g., including state variables, descriptors, output virtual port number, etc.). Once the BFD packet has been completed, the packet is forwarded on to the appropriate MPLS tunnel egress virtual port 58.

In step 5, the MPLS tunnel egress virtual port 58 treats the BFD packet in the same fashion as incoming user data traffic, such that the BFD packet is encapsulated (i.e., the LSP labels and the GAL label are added to the stack) and multiplexed into the MPLS LSP.

Figure 8:
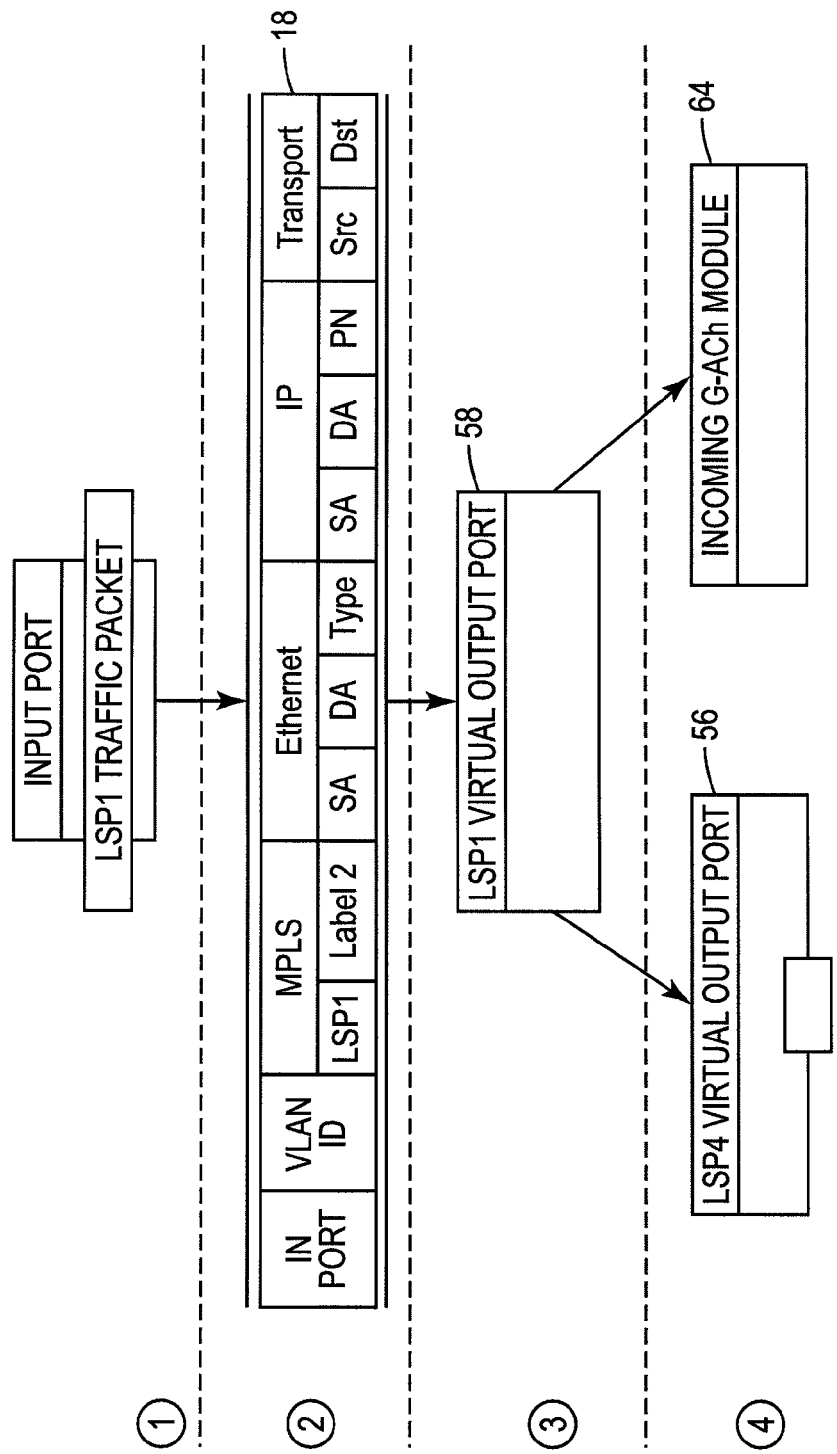
FIG. 8 is a packet flow diagram depicting the reception of packets on a control channel by an OpenFlow switch and the processing of the packets according to one embodiment of the present invention.

FIG. 8 depicts a diagram illustrating the process of an OpenFlow switch 10 receiving BFD Packets on an MPLS G-Ach control channel and the processing of the BFD Packets. The steps discussed below correspond to the numbered sections of FIG. 8.

In step 1, all incoming BFD packets enter the switch 10 in the same way as any other packet that is a part of an MPLS LSP—that is, the packet is received at a physical port an forwarded to the flow table 12 for matching.

In step 2, the incoming MPLS packet is matched with an entry 18 in the flow table 12 and forwarded to an MPLS tunnel egress virtual port 58.

In step 3, the MPLS tunnel egress virtual port 58 removes the top label of the packet. After the top label has been removed, the MPLS tunnel egress virtual port 58 examines any labels still on the stack. If the new top label (if there is one left after the removal of the old top label) is the GAL label, it should be processed by the OAM packet processing unit 64 and not forwarded as part of the MPLS LSP.

In step 4, when received by the OAM packet processing unit 64, the Channel Type of the packet is examined. The Channel Type field indicates the type of message carried on the associated control channel. If the Channel Type identifies the packet as a BFD packet, the packet is sent to a link failure detection unit 66.

The link failure detection unit 66 implements the failure timer for each BFD session in which the OpenFlow switch 10 is involved. Therefore, when the link failure detection unit 55 receives a packet from the OAM packet processing unit 64, it performs a lookup in the BFD Session Information Database (based on the MEP-ID found in the ACH TLVs), and updates the associated BFD session data. The link failure detection unit 66 also resets the failure timer for the BFD session.

If the failure timer expires—i.e., a path or link monitored by BFD has failed—the incoming traffic must be redirected to the backup path or link. This is handled by the link failover unit 68, which is notified by the link failure detection unit 66 whenever a failure timer expires. The link failover unit 68 locates the BFD session data associated with the expired failure timer, and identifies the backup BFD session from within the BFD session data. The BFD session data for each LSP includes the flow table rule 20 and MEP-ID of both the working and backup LSPs. By identifying the backup LSP and extracting the associated flow table rule 20 from the session information database, the link failover unit can update the flow table 12 with the backup path rule 20. When the backup path flow table rule 20 is installed, the traffic redirection is complete.

During its lifetime, a BFD session will use at least two different transmission timer intervals, one before the session has been established (e.g., larger than 1 second) and another after the BFD session has been established and which depends upon the failure detection resolution required. As such, a particular BFD session must be able to move between different packet generators 52 and Multicast Group Mods 62 when the transmission timer interval changes.

Figure 9:
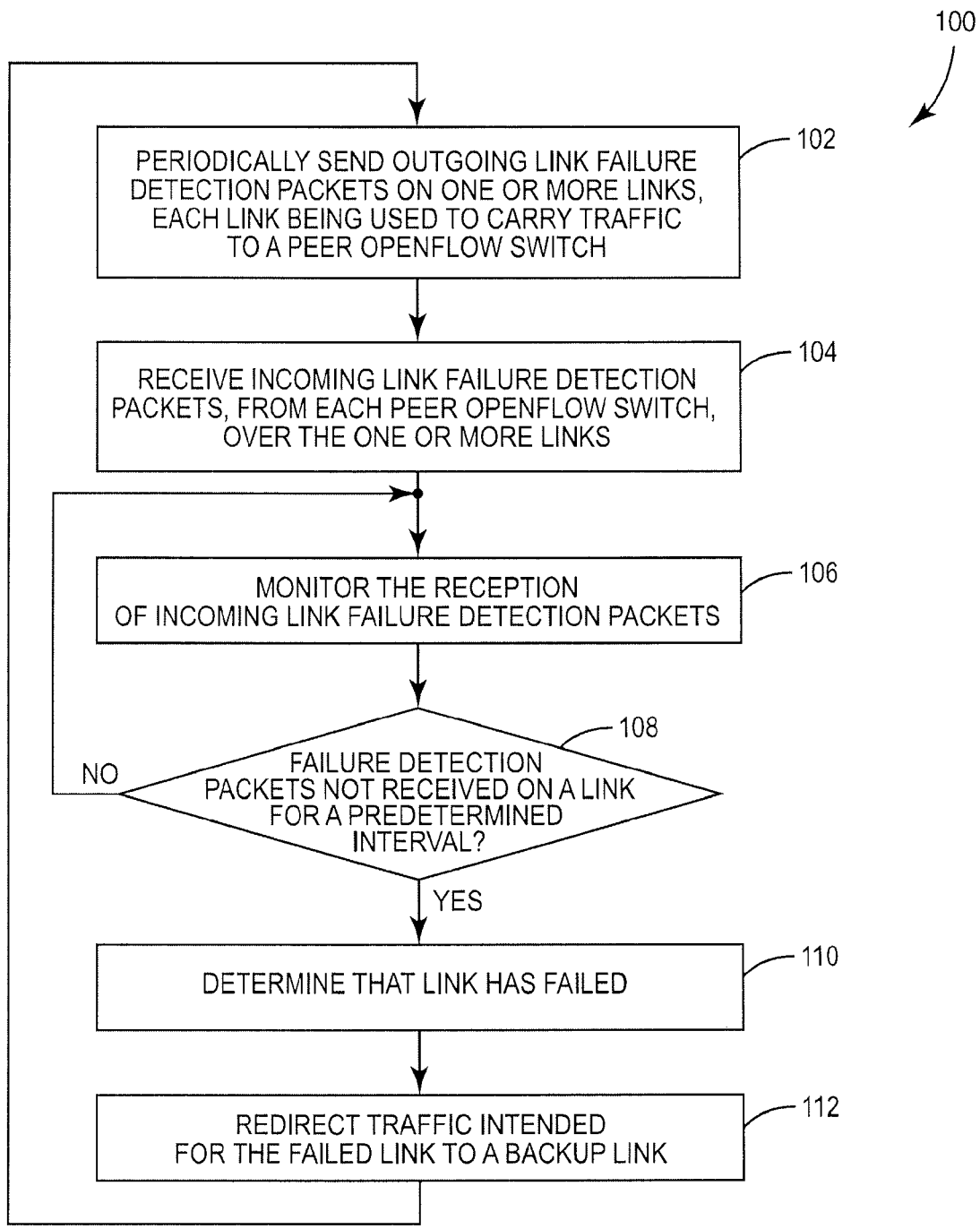
FIG. 9 is a flow diagram of a method of operating an OpenFlow switch according to one embodiment of the present invention.

FIG. 9 depicts a flow diagram of a method 100 of operating an OpenFlow switch 10. Those of skill in the art will recognize that failure detection and traffic redirection are ongoing, continuous processes in a network switch 10. Accordingly, many of the steps of method 100 occur continuously, or in parallel. However, for the purpose of explanation, the method 100 may be considered to "begin" at block 102, in which outgoing link failure detection packets are periodically sent on one or more links, each link being used to carry traffic to a peer OpenFlow switch 10. Incoming link failure detection packets, from each peer OpenFlow switch 10, are received over the one or more links (block 104). The reception of incoming link failure detection packets is monitored (block 106). If incoming link failure detection packets are regularly received on each link—that is, received within a predetermined interval specific to each particular link (block 108)— the switch 10 continues to monitor their reception (block 106). However, if incoming link failure detection packets have not been received on a particular link for a predetermined interval (block 108), then it is determined that the link has failed (block 110). In this case, traffic intended for the failed link is redirected to a backup link (block 112).

Although the above embodiments have been described with respect to the use of the MPLS-TP in order to carry the BFD data, the present invention is not so limited. The BFD packets could be sent in an IP network without the need to make use of MPLS-TP. Furthermore, BFD has two operating modes, asynchronous mode and demand mode, and the methods described above can implement either of these modes. In addition, as an adjunct to both modes, BFD also provides the echo function, wherein a stream of BFD echo packets are transmitted in such a way that the target system loops or echoes these messages back to the sending system through its forwarding path. The methods described above can also implement this echo function.

In general, the present invention may be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. An apparatus configured to operate as an OpenFlow switch, comprising:
   one or more OpenFlow virtual ports operative to generate outgoing link failure detection packets;
   a transmitter operative to periodically send the outgoing link failure detection packets on one or more links, each link being used to carry traffic to a peer OpenFlow switch;
   a receiver operative to receive incoming link failure detection packets, from each peer OpenFlow switch, over the one or more links;
   a link failure detection unit operative to monitor the reception of incoming link failure detection packets and further operative to determine that a link has failed if incoming link failure detection packets have not been received on that link for a predetermined interval; and
   a link failover unit operative to redirect traffic intended for a failed link to a backup link in response to a determination of a link failure;
   wherein the link failure detection packets comprise Bidirectional Forwarding Detection (BFD) packets;
   wherein the one or more links comprise Multi-protocol Label Switching (MPLS) tunnels, and wherein the BFD packets are carried using the MPLS Transport Profile (MPLS-TP);
   wherein the BFD packets are generated with a Generic Associated Channel Label (GAL) by an Open Flow virtual port and have an Associated Channel header (ACH), an ACH Type-Length-Value (TLV) header, and one or more ACH TLVs inserted by a field modifying virtual port.

2. The apparatus of claim 1 wherein each Open Flow virtual port generate outgoing link failure detection packets with a predetermined period.

3. The apparatus of claim 1 further comprising:
   a flow table configured with a plurality of multicast entries, wherein each multicast entry matches outgoing link failure detection packets with a predetermined period, and operative to identify a multicast group unit that the matching outgoing link failure detection packets should be sent to; and
   one or more multicast group units each associated with a multicast group, each multicast group comprising one or more links on which outgoing link failure detection packets are to be sent with the predetermined period.

4. The apparatus of claim 3 wherein each multicast group unit is configured to replicate outgoing link failure detection packets such that there is an outgoing link failure detection packet for each of one or more links in the multicast group associated with the multicast group unit.

5. The apparatus of claim 1 further comprising a field modifying virtual port for each of the one or more links, wherein the field modifying virtual port is operative to insert link-specific data into one or more fields of the outgoing link failure detection packets.

6. The apparatus of claim 1 further comprising a link information database operative to store link-specific information relating to each of the one or more links.

7. The apparatus of claim 6 wherein the information relating to each of the one or more links comprises information selected from the group consisting of an identifier for the Open Flow switch, an identifier for a peer OpenFlow switch, one or more identifiers for a link failure detection session between the Open Flow switch and a peer Open Flow switch, the predefined interval for the link failure detection session, and information identifying the backup link.

8. The apparatus of claim 1 further comprising a packet processing unit operative to identify incoming link failure detection packets and further operative to forward identified incoming link failure detection packets to the link failure detection unit.

9. The apparatus of claim 1 wherein the link failover unit is configured to add or modify one or more entries in a flow table in order to redirect traffic intended for a failed link on to a backup link.

10. The apparatus of claim 1 further comprising, for each of the one or more MPLS tunnels, an MPLS tunnel ingress virtual port operative to assign an MPLS label on to the outgoing BFD packets.

11. The apparatus of claim 1 further comprising, for each of the one or more MPLS tunnels, an MPLS tunnel egress virtual port operative to remove an MPLS label from any incoming packets and further operative to forward the incoming packets to a packet processing unit if the incoming packets have a GAL.

12. The apparatus of claim 1 further comprising a packet processing unit is configured to determine if an incoming packet is an incoming BFD packet.

13. The apparatus of claim 1 further comprising a flow table is configured with a plurality of MPLS tunnel entries, each MPLS tunnel entry matching incoming packets received on a specific MPLS tunnel and identifying an MPLS tunnel egress virtual port to which the matching incoming packets should be sent.

14. A method of operating an OpenFlow switch, comprising:
configuring the OpenFlow switch with one or more OpenFlow virtual ports operative to generate outgoing link failure detection packets;
periodically sending the outgoing link failure detection packets on one or more links, each link being used to carry traffic to a peer OpenFlow switch;
receiving incoming link failure detection packets, from each peer OpenFlow switch, over the one or more links;
monitoring the reception of incoming link failure detection packets;
determining that a particular link has failed if incoming link failure detection packets have not been received on that link for a predetermined interval; and
redirecting traffic intended for the failed link to a backup link;
wherein the link failure detection packets comprise Bidirectional Forwarding Detection (BFD) packets;
wherein the one or more links comprise Multi-protocol Label Switching (MPLS) tunnels, and wherein the BFD packets are carried using the MPLS Transport Profile (MPLS-TP);
wherein the BFD packets are generated with a Generic Associated Channel Label (GAL) by an OpenFlow virtual port and have an Associated Channel header (ACH), an ACH Type-Length-Value (TLV) header, and one or more ACH TLVs inserted by a field modifying virtual port.

15. The method of claim 14, wherein each OpenFlow virtual port generates outgoing link failure detection packets with a predetermined period.

16. The method of claim 14 further comprising configuring the OpenFlow switch with one or more multicast group units, each associated with a multicast group, each multicast group comprising one or more links on which outgoing link failure detection packets are sent with the predetermined period.

17. The method of claim 16 further comprising:
comparing outgoing link failure detection packets to a flow table, the flow table being configured with a plurality of multicast entries, wherein each multicast entry is operative to match outgoing link failure detection packets with a predetermined period and is further operative to identify a multicast group unit; and
sending the outgoing link failure detection packets to the multicast group unit identified in the matching multicast entry.

18. The method of claim 17 further comprising, at each multicast group unit, replicating outgoing link failure detection packets such that there is an outgoing link failure detection packet for each of one or more links in the multicast group associated with the multicast group unit.

19. The method of claim 18 further comprising configuring the OpenFlow switch with a field modifying virtual port for each of the one or more links.

20. The method of claim 19 further comprising:
sending each of the replicated outgoing link failure detection packets to the appropriate field modifying port; and
inserting, at the field modifying port, link-specific data into one or more fields of the outgoing link failure detection packets.

21. A non-transitory machine-readable medium including one or more computer programs operative to cause a computing apparatus operatively connected to a communication network to operate as an Open Flow switch, the computer programs operative to cause a computing apparatus to:
configure the OpenFlow switch with one or more OpenFlow virtual ports operative to generate outgoing link failure detection packets;
periodically send the outgoing link failure detection packets on one or more links, each link being used to carry traffic to a peer OpenFlow switch;
receive incoming link failure detection packets, from each peer OpenFlow switch, over the one or more links;
monitor the reception of incoming link failure detection packets;
determine that a particular link has failed if incoming link failure detection packets have not been received on that link for a predetermined interval; and
redirect traffic intended for the failed link to a backup link;
wherein the link failure detection packets comprise Bidirectional Forwarding Detection (BFD) packets;
wherein the one or more links comprise Multi-protocol Label Switching (MPLS) tunnels, and wherein the BFD packets are carried using the MPLS Transport Profile (MPLS-TP);
wherein the BFD packets are generated with a Generic Associated Channel Label (GAL) by an OpenFlow virtual port and have an Associated Channel header (ACH), an ACH Type-Length-Value (TLV) header, and one or more ACH TLVs inserted by a field modifying virtual port.

22. A computer system operatively connected to a communication network and configured to operate as an OpenFlow switch, the computer system comprising:
one or more OpenFlow virtual ports operative to generate outgoing link failure detection packets;
a transmitter operative to periodically send the outgoing link failure detection packets on one or more links connected to the communication network, each link being used to carry traffic to a peer OpenFlow switch;
a receiver operative to receive incoming link failure detection packets over the one or more links from each peer OpenFlow switch; and
a processor operative to monitor the reception of incoming link failure detection packets, further operative to determine that a link has failed if incoming link failure detection packets have not been received on the link for a predetermined interval, and still further operative to redirect traffic intended for a failed link to a backup link;

wherein the link failure detection packets comprise Bidirectional Forwarding Detection (BFD) packets;

wherein the one or more links comprise Multi-protocol Label Switching (MPLS) tunnels, and wherein the BFD packets are carried using the MPLS Transport Profile (MPLS-TP);

wherein the BFD packets are generated with a Generic Associated Channel Label (GAL) by an OpenFlow virtual port and have an Associated Channel header (ACH), an ACH Type-Length-Value (TLV) header, and one or more ACH TLVs inserted by a field modifying virtual port.

* * * * *